(12) United States Patent
Abe et al.

(10) Patent No.: US 6,844,640 B2
(45) Date of Patent: Jan. 18, 2005

(54) ELECTRICAL EQUIPMENT FOR MOUNTING ON VEHICLES, ELECTRICAL MACHINES, AND MANUFACTURING METHODS OF THE SAME

(75) Inventors: Mitsutoshi Abe, Hitachinaka (JP); Shigeru Yumiyama, Hitachinaka (JP); Kazuyuki Mori, Hitachinaka (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 102 days.

(21) Appl. No.: 10/084,473

(22) Filed: Feb. 28, 2002

(65) Prior Publication Data

US 2003/0025406 A1 Feb. 6, 2003

(30) Foreign Application Priority Data

Aug. 6, 2001 (JP) ........................................ 2001-237463

(51) Int. Cl.$^7$ ................................................. H02K 5/00
(52) U.S. Cl. ............................................ 310/89; 310/45
(58) Field of Search ..................................... 310/89, 45

(56) References Cited

U.S. PATENT DOCUMENTS

| | | | | |
|---|---|---|---|---|
| 1,967,031 A | * | 7/1934 | Lee | 427/522 |
| 3,619,383 A | * | 11/1971 | Eisner | 205/93 |
| 4,156,817 A | * | 5/1979 | Preece et al. | 290/38 R |
| 4,411,964 A | | 10/1983 | Hara et al. | 428/626 |
| 4,700,093 A | | 10/1987 | Negishi | 310/89 |
| 5,049,245 A | * | 9/1991 | Nomura et al. | 205/152 |
| 5,179,864 A | * | 1/1993 | Ueta et al. | 74/7 A |
| 5,201,111 A | * | 4/1993 | Prohaska | 29/596 |
| 5,298,824 A | | 3/1994 | Franz | 310/89 |
| 5,304,877 A | | 4/1994 | Baek | 310/45 |
| 5,846,660 A | * | 12/1998 | Sasaki et al. | 428/413 |
| 6,211,584 B1 | * | 4/2001 | Kurosawa et al. | 310/45 |
| 6,294,072 B1 | * | 9/2001 | Fairbourn | 205/706 |
| 6,315,885 B1 | * | 11/2001 | Hocheng | 205/652 |
| 6,607,844 B1 | * | 8/2003 | Araga et al. | 428/624 |
| 6,652,728 B1 | * | 11/2003 | Sonntag et al. | 205/143 |

FOREIGN PATENT DOCUMENTS

| | | |
|---|---|---|
| GB | 2061021 A | 5/1981 |
| JP | 57-108292 | 7/1982 |
| JP | 04-062150 | 2/1992 |
| JP | 06-172870 | * 6/1994 |
| JP | 07-180069 | 7/1995 |
| JP | 08-218183 | 8/1996 |
| JP | 09-327147 | 12/1997 |
| JP | 10-285856 | 10/1998 |

\* cited by examiner

*Primary Examiner*—Thanh Lam
*Assistant Examiner*—Judson H. Jones
(74) *Attorney, Agent, or Firm*—Crowell & Moring LLP

(57) ABSTRACT

Electric equipment is provided for mounting on vehicles and electrical machines having superior rust-prevention film, which makes it possible to prevent vehicles from generating red rust even if outer surface of magnetic core housing of the vehicle is damaged by bouncing a stone and the like during running, and also to provide manufacturing methods of the same. Any outer surface and surface exposed outward of the magnetic core housing is coated sequentially with a metal plated layer or an alkali zinc plated layer, chromate film or zinc phosphate film, and organic resin coating.

21 Claims, 2 Drawing Sheets

ELECTRICAL EQUIPMENT FOR MOUNTING ON VEHICLES, ELECTRICAL MACHINES, AND MANUFACTURING METHODS OF THE SAME

BACKGROUND OF THE INVENTION

This application claims the priority of Application No. 2001-237463, filed Aug. 6, 2001, in Japan, the disclosure of which is expressly incorporated by reference herein.

The present invention relates to novel electrical equipment for mounting on vehicles, electrical machines and electromagnetic switches using the same, starters for starting internal ignition engines using the same, and manufacturing methods of the same.

Conventionally, outer surfaces of magnetic core housing of electrical equipment for mounting on vehicles are treated for rust proofing. JP-A-9-327147 (1997) discloses a starter provided with a cylindrical yoke, of which outer peripheral surface is coated with epoxy resin group paint, or is provided with a cylinder made of rust proof glass-fiber reinforced nylon resin. JP-A-10-285856 (1998) discloses a starting motor, of which yoke and rear bracket are coated after assembling.

JP-A-57-108292 (1982), JP-A-4-62150 (1992), JP-A-7-180069 (1995), and JP-A-8-218183 (1996) disclose a rust proof steel plate for vehicles, which is treated by Zn plating, chromate treatment, and resin coating, sequentially.

However, in accordance with the above-mentioned disclosures, it has not been entirely considered that, when a scratch is generated on the painted surface of a starter of running vehicle by bouncing a stone and the like, red rust is readily generated from the scratch.

Furthermore, the surface of conventional magnetic core housing of electrical equipment for mounting on vehicles of the prior art described above has such problems that sufficient corrosion resistance can not be obtained because the cylindrical resin has low adhesiveness onto the outer surface of the housing as the rust-preventing method of the outer surface, and that only painting for rust-prevention is easily damaged to generate scratch by bouncing a stone and the like, and red rust is readily generated from the scratch. With regard to the rust proof steel plate for vehicles, any particular usage for starters is not disclosed.

SUMMARY OF THE INVENTION

One of the objects of the present invention is to provide electrical equipment for mounting on vehicles and electrical machines having superior rust-prevention film, which makes it possible to prevent vehicles from generating red rust even if outer surface of magnetic core housing of the vehicle is damaged by bouncing a stone and the like during running, and also to provide manufacturing methods of the same.

The present invention relates to electrical equipment for mounting on vehicles, which are featured by having outer surface or surface exposed to outward of a magnetic core housing, whereon a metallic plated layer, chromate coating or phosphoric acid anodic oxide coating, and organic coating are sequentially applied.

The metallic plated layer is made any of Zn or a Zn alloy, Ni or a Ni alloy, and Sn or a Sn alloy; and it is desirable that the organic coating is made any of epoxy resin, phenol resin, acrylic resin, polyester resin, styrene resin, polyethylene resin, and polyurethane resin.

Furthermore, the present invention relates to electrical equipment for mounting on vehicles, which are featured by having outer surface or surface exposed to outward of a magnetic core housing, whereon an alkali zinc electrically plated layer, chromate coating or phosphoric acid anodic oxide coating, and phenol group electrostatic coating are sequentially applied.

Furthermore, in accordance with the present invention, it is desirable to apply phosphoric acid anodic oxide coating prior to applying the metallic plated layer.

It is desirable that degreasing, phosphoric acid anodic oxide coating, and cleaning are sequentially applied prior to applying the metallic plated coating or the alkali zinc electrically plated layer; and that ultrasonic cleaning and diluted sulfuric acid treatment are sequentially applied after applying the metallic plated layer or the alkali zinc electrically plated layer prior to the chromate treatment or phosphoric acid treatment.

The additive amount of chromium by the chromate treatment is desirably in the range of 10–100 mg/m$^2$, preferably in the range of 20–60 mg/m$^2$, and the additive amount of paint by the organic coating is desirably in the range of 50–200 mg/m$^2$, preferably in the range of 80–150 mg/m$^2$.

The present invention relates to rotary electric machines comprising a cylindrical yoke, wherein a magnetic field device is fixed at inner circumferential plane, front bracket and rear bracket provided respectively at each ends in the axial direction of the yoke, and a rotor; wherein the yoke is featured by being composed of the electrical equipment for mounting on vehicles described above.

The present invention relates to electromagnetic switches comprising a cylindrical yoke, wherein a field apparatus is fixed at inner circumferential plane; a plunger provided at one end in the axial direction of the yoke, which is movable in the field apparatus in the axial direction; and a boss provided at another end of the yoke facing to the plunger; wherein the yoke is featured by being composed of the electrical equipment for mounting on vehicles described above.

With regard to the rotary electric machines, it is desirable that the metallic plated layer or the alkali zinc electrically plated layer, and chromate coating or phosphoric acid anodic oxide coating are applied onto the single yoke member before assembling; and the organic coating is applied onto the field apparatus fixed to the yoke after assembling.

With regard to the electromagnetic switches, it is desirable that the metallic plated layer or the alkali zinc electrically plated layer, and chromate coating or phosphoric acid anodic oxide coating are applied onto the single yoke member before assembling without applying the degreasing, phosphoric acid treatment, and cleaning before applying the metallic plated layer or the alkali zinc electrically plated layer, and chromate coating or phosphoric acid anodic oxide coating; and the organic coating is applied onto the field apparatus fixed to the yoke after assembling.

The yoke of the rotary electric machines is desirably made of mild steel composed of C equal to or less than 0.12%, preferably in the range of 0.05–0.10%, Si equal to or less than 0.35, preferably in the range of 0.1–0.35%, Mn equal to or less than 0.60%, preferably in the range of 0.1–0.6%, and the residual is substantially Fe, respectively by weight.

The yoke of the electromagnetic switches is desirably made of mild steel composed of C equal to or less than 0.10%, preferably in the range of 0.05–0.10%, Mn equal to or less than 0.60%, preferably in the range of 0.3–0.6%, and the residual is substantially Fe, respectively by weight.

The present invention relates to a starter for internal combustion engine featured by being composed of the rotary electric machines and electromagnetic switches described above.

The present invention relates to a method of manufacturing electrical equipment for mounting on vehicles featured by that the steps of degreasing, phosphoric acid treatment, and cleaning are sequentially applied to outer surface or surface exposed to outward of a magnetic core housing, and subsequently, the steps of metallic plated layer formation, chromate coating or phosphoric acid anodic oxide coating, and organic coating are sequentially applied.

The present invention relates to a method of manufacturing electrical equipment for mounting on vehicles featured by that the step of forming a metallic plated layer, and the step of ultrasonic cleaning treatment, and diluted sulfuric acid treatment are applied sequentially, and subsequently, chromate coating or phosphoric acid anodic oxide coating, and organic coating are sequentially applied.

The present invention relates to a method of manufacturing electrical equipment for mounting on vehicles featured by being composed of a combination of the two methods described above.

The present invention is featured by manufacturing the yoke composing the rotary electric machines and the electromagnetic switches by the methods of manufacturing electrical equipment for mounting on vehicles described above, and by manufacturing a starter for internal combustion engine composed of the rotary electric machines and the electromagnetic switches described above by the method described above.

BRIEF DESCRIPTION OF THE DRAWINGS

These and other objects, features and advantages of the present invention will be understood more clearly from the following detailed description with reference to the accompanying drawings, wherein.

DETAILED DESCRIPTION OF THE PREFERRED EMBODIMENTS

Hereinafter, details of the present invention is explained referring to drawings.
(Embodiment 1)

Figure 1:
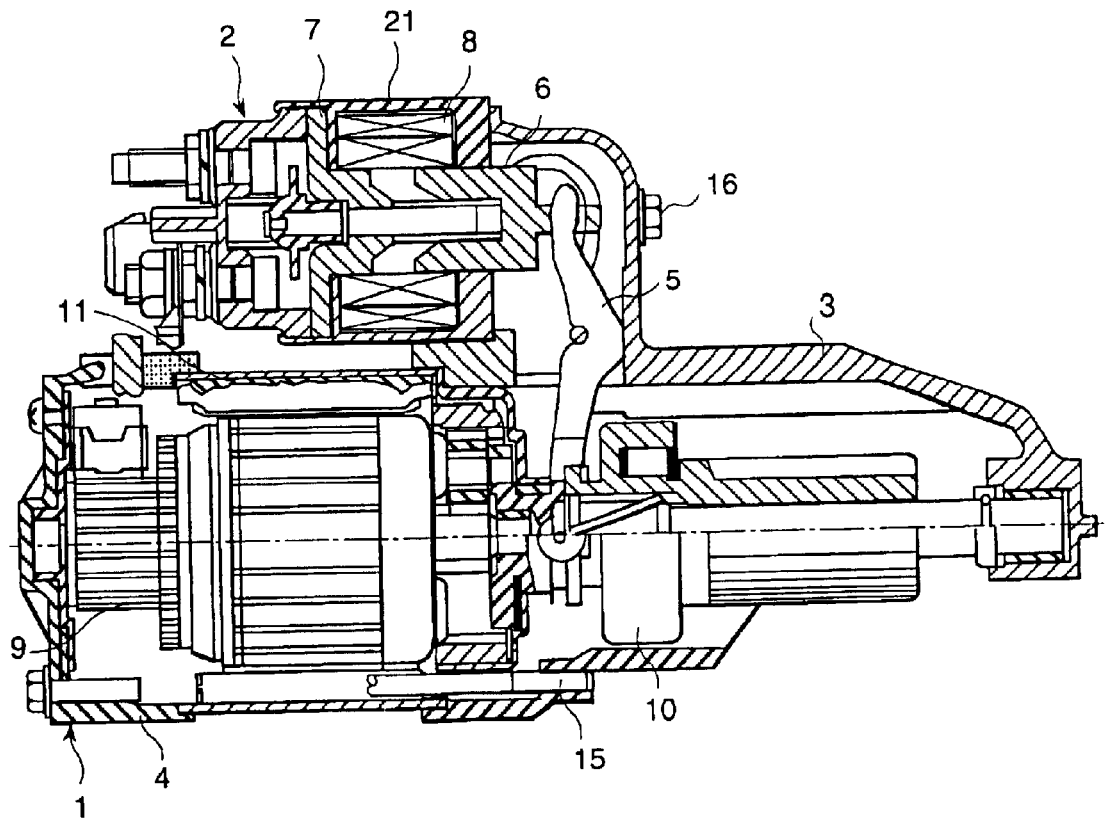
FIG. 1 is a cross sectional view of a starter for internal combustion engine relating to the present invention.

FIG. 1 is a cross sectional view of a starter for internal combustion engine relating to the present invention. The cylindrical yoke 11 for the motor 1 as a magnetic core housing; and the coil case 21, one end of the electromagnetic switch 2 of which has an opening wherein the magnetic core 7 is inserted, and the other end of which has an opening for inserting the plunger 6; are made of mild steel. The yoke 11 is fixed to the front bracket 3 by the through bolts 15. The shaft of the rotor 9 is supported by the rear bracket 4.

The electromagnetic switch 2 is fixed to the front bracket 3 by the bolt 16, and is inserted and supported into the plunger 6 which forms a movable iron core. Upper end portion of the shift lever 5 is engaged with the plunger 6, and lower end portion of the shift lever is engaged with the over running clutch 10.

Hereinafter, operation is explained. When switch of the starter is turned on, the exciting coil 8 of the electromagnetic switch 2 is energized; the plunger 6 is attracted and moved inward; the shift lever 5 is rotated anti-clockwise in the figure; and the over running clutch 10 is moved forward. When the engine is started and the starting switch is turned off, the shift lever 5 is rotated clockwise in the figure by moving outward of the plunger 6; and the over running clutch 10 is moved backward.

Figure 2:
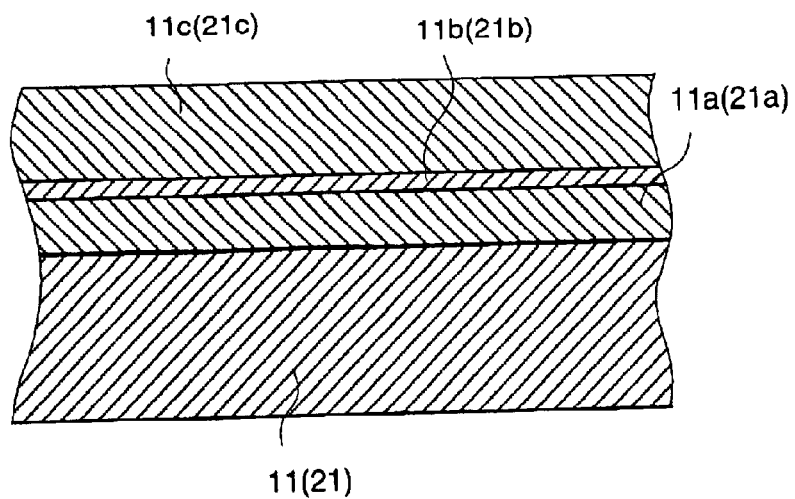
FIG. 2 is a partial cross section of an important portion of the surface treated member relating to the present invention.

FIG. 2 is a cross sectional view of the member having a Zn plated layer as a first layer 11a (21a); a chromate layer as a second layer 11b (21b); and a resin coating such as epoxy group resin, phenol group resin, and the like as a third layer 11c (21c) as a corrosion prevention specification of the yoke 11 and the coil case 21. These layers are coated on whole area of the yoke 11 outer surface, and the coil case 21 outer surface. The yoke 11 was made of mild steel specified as JIS (Japanese Industrial Standard) G3445 containing C equal to or less than 0.12% by weight, Si equal to or less than 0.35%, and Mn equal to or less than 0.60%. The coil case 21 was made of mild steel specified as JIS (Japanese Industrial Standard) G3539 containing C equal to or less than 0.10% by weight, and Mn equal to or less than 0.60%.

Zn was plated by electroplating method using an alkaline plating solution containing Zn 8–12 g/l, sodium hydroxide 100–150 g/l, and somewhat of a brightening agent. As a pre-treatment, the yoke was treated sequentially by degreasing, phosphoric acid treatment, electrolytic cleaning, and neutralization. The phosphoric acid treatment was performed with a solution containing zinc phosphate, orthophosphoric acid, zinc nitrate, calcium phosphate, and organic acids. The phosphoric acid treatment was not performed on the coil case 21.

Subsequently, the yoke 11 and the coil case 21, which were plated with zinc by electrically, were cleaned by washing with hot water, ultrasonic washing, and diluted sulfuric acid treatment. Then, a chromate solution consisting of chromic anhydride (20 g/l), silicic acid colloid (20 g/l), and cobalt acetate (1 g/l) was applied onto the whole outer surface of the yoke 11 and the coil case 21, and were dried at 90° C. (plate temperature 60° C.) for 20 seconds.

Subsequently, each of the yoke 11 and the coil case 21, which was plated with zinc by electrically, was assembled, and cleaned; and the whole outer surface described above was painted by electrostatic method with a phenol group paint by masking, and was dried at 120° C. for 20 seconds. The adhered amount of Cr on the surface obtained in a manner described above was 0.4 g/dm$^2$ and the adhered amount of the resin coating was 120 g/m$^2$.

Figure 3A:
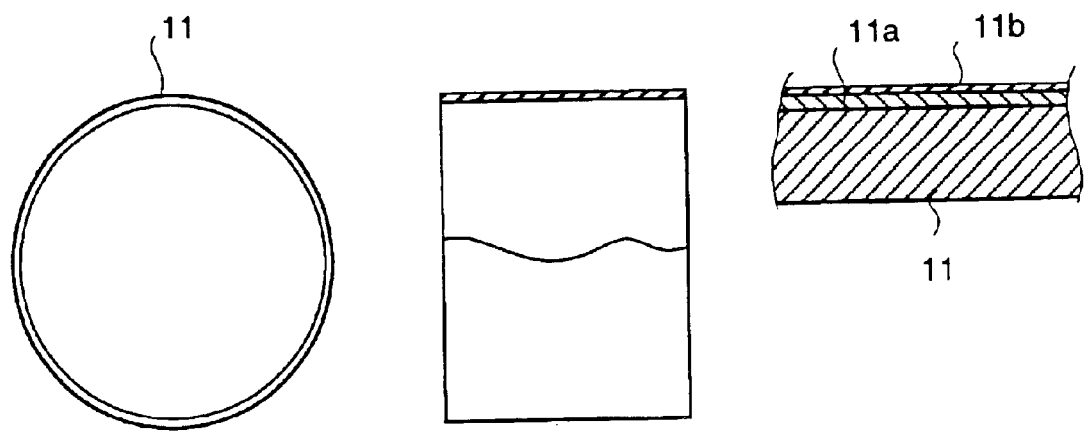
FIGS. 3(A) and 3(B) are a set of partial cross sectional view of the yoke indicating the steps of the treatment of the present invention.
Figure 3B:
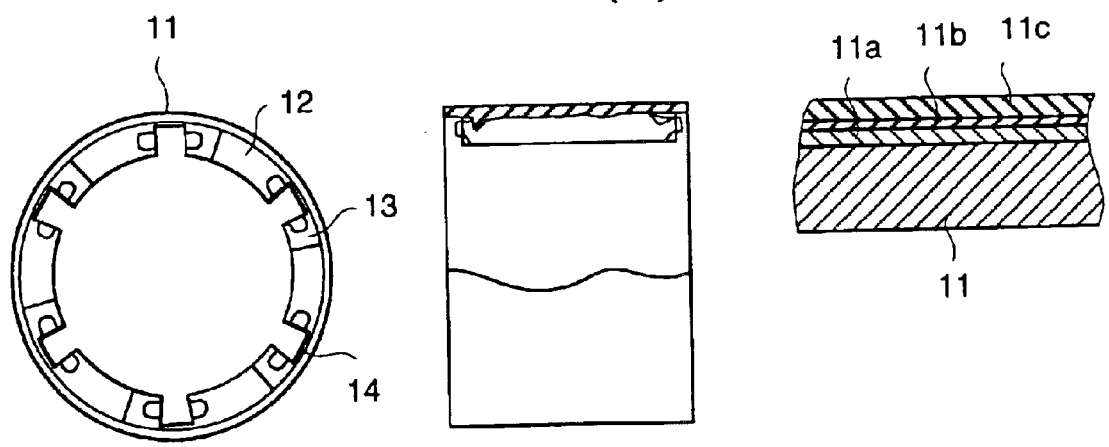

FIG. 3 is a cross section of the yoke for starter of vehicles, of which surface treatment of the present invention was explained previously. As indicated in FIG. 3(a), the outer surface of the yoke 11 in a condition of single member of magnetic core housing is coated with a Zn plated layer as the first layer 11a, and a chromate treatment film 11b as the second layer. Then, as indicated in FIG. 3(b), the yoke is assembled with magnet 12, pole core 13, and pole stay 14, and subsequently, the yoke assembly or a starter assembly is coated with the resin coating as the third layer 11c.

With regard the coil case 21, a single member of the coil case 21 before assembling is coated with a Zn plated layer and a chromate treatment film. Subsequently, the coil 8 is fixed to the coil case 21 and assembled, and the resin coating described previously is performed.

In accordance with the surface treatment described above, pealing off of the third layer 11c of the resin coating at additional fastening and thread fastening during assembling was prevented, and a superior corrosion resistance was obtained.

In accordance with the present embodiment, even if a scratch is generated on coated film surface of the third layer 11c (21c) by bouncing a stone and the like during running the vehicles, the chromate layer of the second layer 11b (21b) or the Zn layer of the first layer 11a (21a) is exposed at the scratch, and red rust is not generated readily from the scratch even if water or salt water is splashed to the scratch, because of the presence of the chromate layer or the Zn layer. Therefore, superior corrosion resistance can be obtained.

The first layer 11a (21a) of the Zn plated layer can be replaced with other metal plated layer such as Ni, Sn, or a Zn alloy plated layer containing Ni, Fe and the like equal to or less than 10% by weight. As for the second layer 11b (21b), the chromate treatment can be replaced with a corrosion protection treatment such as phosphoric acid zinc treatment, organic metal coating treatment, and the like.

(Embodiment 2)

In accordance with the present embodiment, Zn plating was performed as the first layer 11a (21a), a phosphoric acid zinc treatment was performed as the second layer 11b (21b), and epoxy resin coating or phenol resin coating, and the like was performed as the third layer 11c (21c). The same advantages as the first embodiment could be obtained. The phosphoric zinc treatment was as same as the one used for the pre-treatment in the first embodiment.

The first layer 11a (21a) of the Zn plated layer can be replaced with other metal plated layer such as Ni, Sn, or a Zn alloy plated layer containing Ni, Fe and the like equal to or less than 10% by weight. As for the second layer 11b (21b), a phosphoric acid zinc treatment can be used, and a corrosion protection treatment such as an organic metal coating treatment, and the like can be used for the third layer 11c (21c).

In accordance with the present invention, even if a scratch is generated on outer surface of the magnetic core housing by bouncing a stone and the like, red rust is not generated readily from the scratch, and superior corrosion resistance can be obtained. As the result, a starter for starting internal combustion engines having superior corrosion resistance can be provided.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Electrical equipment for mounting on vehicles; wherein exposed surfaces of components of the equipment including a magnetic core housing are coated sequentially with a metal plated layer, chromate film, and organic resin coating such that a finished assembly of the components has a rust prevention coating.

2. Electrical equipment as claimed in claim 1; wherein said organic resin coating is made of any one of epoxy resin, phenol resin, acrylic resin, polyester resin, styrene resin, polyethylene resin, and polyurethane resin.

3. Electrical equipment as claimed in claim 1; wherein the equipment is made by a process of degreasing, a phosphoric acid treatment, and an additional cleaning treatment are performed prior to coating with said metal plated layer.

4. Electrical equipment as claimed in claim 1; wherein the equipment is made by a process of a ultrasonic cleaning treatment and a diluted sulfuric acid treatment are performed sequentially after coating with said metal plated layer prior to one of a chromate film treatment and a phosphoric acid treatment.

5. Electrical equipment as claimed in claim 1; wherein the additive amount of chromium by the chromate treatment is desirably in the range of 10–100 mg/m$^2$.

6. Electrical equipment as claimed in claim 1; wherein the organic resin coating is a paint added in an amount in the range of 50–200 mg/m$^2$.

7. A rotary electric machine comprising:
a cylindrical yoke, wherein a magnetic field device is fixed onto inner circumferential plane,
a front bracket and a rear bracket, each of which is provided respectively at one end and the other end of said yoke in the axial direction, and
a rotor, wherein
said yoke is composed of the electrical equipment for mounting on vehicles as claimed in claim 1.

8. An electromagnetic switch comprising:
a cylindrical yoke, wherein a cylindrical magnetic field device is fixed at inner circumferential plane, a plunger provided at one end in the axial direction of the yoke, which is movable in the magnetic field device in the axial direction, and
a magnetic core provided at another end of the yoke facing to the plunger; wherein
said yoke is composed of the electrical equipment for mounting on vehicles as claimed in claim 1.

9. A rotary electric machine as claimed in claim 7, wherein
said yoke is made of mild steel composed of C equal to or less than 0.12%, Si equal to or less than 0.35, Mn equal to or less than 0.60%, and the residual is substantially Fe, respectively by weight.

10. An electromagnetic switch as claimed in claim 8, wherein
said yoke is made of mild steel composed of C equal to or less than 0.10%, Mn equal to or less than 0.60%, and the residual is substantially Fe, respectively by weight.

11. A starter for internal combustion engine composed of:
a rotary electric machine a cylindrical yoke, wherein a magnetic field device is fixed onto inner circumferential plane,
a front bracket and a rear bracket, each of which is provided respectively at one end and the other end of said yoke in the axial direction, and
a rotor, wherein
said yoke is composed of the electrical equipment for mounting on vehicles, and any of outer surface and surface exposed to outward of magnetic core housing is coated sequentially with a metal plated layer, chromate film, and organic resin coating; and
an electromagnetic switch as claimed in claim 8.

12. Electrical equipment for mounting on vehicles; wherein
exposed surfaces of components of the equipment including a magnetic core housing are coated sequentially with an alkali zinc plated layer, chromate film, and phenol group resin electrostatic coating such that a finished assembly of the components has a rust prevention coating.

13. Electrical equipment as claimed in claim 12; wherein the additive amount of chromium by the chromate treatment is preferably in the range of 10–100 mg/m$^2$.

14. Electrical equipment for mounting on vehicles; wherein vehicles; wherein
exposed surfaces of components of the equipment including a magnetic core housing is coated sequentially with a metal plated layer, phosphate film, and organic resin coating such that a finished assembly of the components which include the magnetic core, has a rust prevention coating at an outer peripheral surface of the magnetic core or to an outer exposed portion thereof.

15. Electrical equipment as claimed in claim 14; wherein said metal plated layer is made of any one of Zn and Zn alloys, Ni and Ni alloys, and Sn and Sn alloys.

16. Electrical equipment as claimed in claim 14; wherein said organic resin coating is made of any one of epoxy resin, phenol resin, acrylic resin, polyester resin, styrene resin, polyethylene resin, and polyurethane resin.

17. Electrical equipment as claimed in claim 14; wherein a degreasing treatment, a phosphoric acid treatment, and a cleaning treatment are performed prior to coating with any of said metal plated layer and said alkali zinc plated layer.

18. Electrical equipment as claimed in claim 14; wherein a ultrasonic cleaning treatment and a diluted sulfuric acid treatment are performed sequentially after coating with any of said metal plated layer and said alkali zinc plated layer, prior to any of said chromate treatment and said phosphoric acid treatment.

19. Electrical equipment as claimed in claim 14; wherein the additive amount of paint by the organic coating is in the range of 50–200 mg/m$^2$.

20. Electrical equipment for mounting on vehicles; wherein
exposed surfaces of components of the equipment including a magnetic core housing is coated sequentially with an alkali zinc plated layer, phosphate film, and phenol group resin electrostatic coating such that a finished assembly of the components has a rust prevention coating.

21. Electrical equipment as claimed in claim 1; wherein said metal plated layer is made of any one of Zn and Zn alloys, Ni and Ni alloys, and Sn and Sn alloys.

* * * * *